United States Patent
Furukawa et al.

(10) Patent No.: US 7,869,595 B2
(45) Date of Patent: Jan. 11, 2011

(54) CONTENT COPYING DEVICE AND CONTENT COPYING METHOD

(75) Inventors: Junichi Furukawa, Osaka (JP);
Kazunori Yamaji, Osaka (JP);
Hisayoshi Zenke, Hyogo (JP);
Kazutoshi Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 790 days.

(21) Appl. No.: 11/814,285

(22) PCT Filed: Jan. 18, 2006

(86) PCT No.: PCT/JP2006/300621

§ 371 (c)(1),
(2), (4) Date: Jul. 19, 2007

(87) PCT Pub. No.: WO2006/077871

PCT Pub. Date: Jul. 27, 2006

(65) Prior Publication Data

US 2009/0022320 A1 Jan. 22, 2009

(30) Foreign Application Priority Data

Jan. 20, 2005 (JP) ............................. 2005-012290
Feb. 22, 2005 (JP) ............................. 2005-045030

(51) Int. Cl.
*H04N 7/167* (2006.01)
*H04L 9/00* (2006.01)
(52) U.S. Cl. .......................... 380/201; 380/44; 713/169
(58) Field of Classification Search ......... 380/200–203, 380/277–278, 281, 284, 44; 726/26, 31–33; 713/168–170; 705/56–59
See application file for complete search history.

(56) References Cited

U.S. PATENT DOCUMENTS 6,014,352 A 1/2000 Kubota et al.
6,606,707 B1 8/2003 Hirota et al.

(Continued)

FOREIGN PATENT DOCUMENTS

EP 0847051 6/1998

(Continued)

OTHER PUBLICATIONS

English language Abstract of JP 11-328033.
English language Abstract of JP 2004-139433.
English language Abstract of JP 2001-333371.
English language Abstract of JP 10-222930.

(Continued)

*Primary Examiner*—Hosuk Song
(74) *Attorney, Agent, or Firm*—Greenblum & Bernstein P.L.C.

(57) ABSTRACT

A content copying device has a mutual authentication section that performs a mutual authentication with a copy source recording medium and a copy destination recording medium respectively and generates a first medium unique key and a second medium unique key, a content key decrypting section that reads an encrypted content key from the copy source recording medium, and decrypts the encrypted content key using information based on the first medium unique key, a content key encrypting section that encrypts the decrypted content key using information based on the second medium unique key and writes the encrypted content key onto the copy destination recording medium, and a content copying section that reads an encrypted content from the copy source recording medium and writes the content onto the copy destination recording medium without performing decryption.

13 Claims, 5 Drawing Sheets

U.S. PATENT DOCUMENTS

| | | |
|---|---|---|
| 7,353,541 B1 * | 4/2008 | Ishibashi et al. .............. 726/26 |
| 2001/0032088 A1 | 10/2001 | Utsumi et al. |
| 2002/0150389 A1 | 10/2002 | Komoda |
| 2004/0078586 A1 | 4/2004 | Sato et al. |

FOREIGN PATENT DOCUMENTS

| | | |
|---|---|---|
| EP | 1054398 | 11/2000 |
| EP | 1426951 | 6/2004 |
| JP | 8-008851 | 1/1996 |
| JP | 10-222930 | 8/1998 |
| JP | 11-328033 | 11/1999 |
| JP | 2000-259775 | 9/2000 |
| JP | 2000-308129 | 11/2000 |
| JP | 2000-330871 | 11/2000 |
| JP | 2001-333371 | 11/2001 |
| JP | 2003-233795 | 8/2003 |
| JP | 2004-139433 | 5/2004 |

OTHER PUBLICATIONS

English language Abstract of JP 2000-259775.
English language Abstract of JP 2000-330871.
English language Abstract of JP 8-008851.
English language Abstract of JP 2003-233795.
English language Abstract of JP 2000-308129.

* cited by examiner

CONTENT COPYING DEVICE AND CONTENT COPYING METHOD

TECHNICAL FIELD

The present invention relates to a device and a method that copies an encrypted content recorded on one recording medium to another recording medium.

BACKGROUND ART

Recently, with the use of the Internet and popularization of mobile telephones, content encryption to eliminate illegal copying of the content and use of recording media capable thereof have become common, and a system capable of reading and writing the encrypted content is being spread.

Conventionally, a mutual authentication is first performed between a content writing device and a recording medium when writing the encrypted content on the recording medium using the content writing device. In mutual authentication, a medium unique ID and a mutual authentication key saved in the recording medium, and a device key in the content writing device are used, and a medium unique key is generated. Then, a content key provided by the content writing device is encrypted with the generated medium unique key to generate an encrypted content key. The encrypted content key is stored in a protective area (area requiring authentication for access) of the recording medium. The content writing device further encrypts the content with the content key, generates an encrypted content, and stored the encrypted content in a data area (area not requiring authentication for access) of the recording medium.

In order to achieve stronger protection of the content between a recording medium and reproduction device, a recording method of recording the content on the recording medium using additional information provided from the outside of the recording medium is proposed (see patent document 1). When writing the content into the recording medium using additional information, a mutual authentication is first performed using a medium unique ID and a mutual authentication key of the recording medium, and a device key in the content recording device, and a medium unique key is generated. Furthermore, a composite key is generated from the medium unique key and the additional information. After encrypting the content key with the composite key, the encrypted content key is recorded in the protective area of the recording medium. Lastly, the content is encrypted with the content key, and the encrypted content is recorded in the data area of the recording medium.

With the wide spread use of systems capable of reading and writing the encrypted content, demands to distribute the encrypted content written on the recording medium in advance are increasing. When distributing a great amount of recording media storing the encrypted content, mass-copying of the recording medium having the same encrypted content is required, and thus a system capable of simultaneously writing the encrypted content on a plurality of recording media becomes necessary. A system for simultaneously writing data in parallel to a plurality of recording media is disclosed in patent document 2.

Patent document 1: JP-A-2004-139433
Patent document 2: JP-A-2000-259775

DISCLOSURE OF INVENTION

Problems to be Solved by the Invention

When copying the content from one recording medium on which the encrypted content is recorded to another recording medium, the encrypted content read from the one recording medium is once decrypted, and the content has to be encrypted again to be recorded on the other recording medium, and thus the process is very complicating. In particular, a more efficient copying method is desired when mass-copying.

In the content recording method disclosed in patent document 1, a very complicating process must be performed, such as storing the additional information encrypted in advance in the data area etc. of the recording medium, decrypting the content after decrypting the previously stored additional information if the device is changed, and thereafter, encrypting and storing the current additional information. In this method, copy of the content between the recording media cannot be performed.

In the data writing device disclosed in patent document 2, the recording medium has a special area such as the protective area, and the process cannot be performed when the content key necessary for decrypting the encrypted content must be encrypted and stored in the special area. As a result, the data writing device disclosed in patent document 2 cannot copy the encrypted content to such a recording medium in a reproducible manner.

The present invention has been made in order to solve the foregoing problems, and its object is to provide a content copying device capable of rapidly and efficiently copying the encrypted content.

Means for Solving the Problems

According to a first aspect of the present invention, a content copying device that copies a content encrypted with a content key from a recording medium as a copy source to a recording medium as a copy destination is provided. The content copying device includes: a mutual authentication section that performs a mutual authentication with the copy source recording medium and generates a first medium unique key, and performs a mutual authentication with the copy destination recording medium and generates a second medium unique key; a content key decrypting section that reads an encrypted content key from the copy source recording medium, and decrypts the encrypted content key using information based on the first medium unique key; a content key encrypting section that encrypts the decrypted content key using information based on the second medium unique key and writes the encrypted content key on the copy destination recording medium; and a content copying section that reads an encrypted content from the copy source recording medium, and writes the encrypted content into the copy destination recording medium without performing decryption.

The information based on the first medium unique key may include the first medium unique key, and the information based on the second medium unique key may include the second medium unique key.

The content copying device may further include a first input section that inputs first additional information or additional information relating to the copy source recording medium; a second input section that inputs second additional information or additional information relating to the copy destination recording medium; a first key composing section that generates a first composite key using the first additional information and the first medium unique key; and a second key composing section that generates a second composite key using the second additional information and the second medium unique key. The content key decrypting section reads the encrypted content key from the copy source recording medium, and decrypts the encrypted content key using the first composite key. The content key encrypting section encrypts the decrypted content key using the second composite key, and writes the encrypted content key into the copy destination recording medium.

According to a second aspect of the present invention, a content copying method of copying a content encrypted by a content key from a copy source recording medium to a copy destination recording medium is provided. The content copying method includes the steps of: performing a mutual authentication with the copy source recording medium and generating a first medium unique key; performing a mutual authentication with the copy destination recording medium and generating a second medium unique key; reading an encrypted content key from the copy source recording medium; decrypting the encrypted content key using information based on the first medium unique key; encrypting the decrypted content key using information based on the second medium unique key; writing the encrypted content key into the copy destination recording medium; and reading an encrypted content from the copy source recording medium, and writing the encrypted content into the copy destination recording medium without performing decryption.

Furthermore, the content copying method may further include the steps of: inputting first additional information or additional information relating to the copy source recording medium; inputting second additional information or additional information relating to the copy destination recording medium; generating a first composite key using the first additional information and the first medium unique key; and generating a second composite key using the second additional information and the second medium unique key. The step of decrypting the content key may include reading the encrypted content key from the copy source recording medium and decrypting the encrypted content key using the first composite key. The step of encrypting the content key may include encrypting the decrypted content key using the second composite key and writing the encrypted content key into the copy destination recording medium.

In a content copying method according to a third aspect of the present invention, the encrypted content read from one copy source recording medium is simultaneously in parallel recorded on a plurality of copy destination recording media using the content copying method according to the second aspect.

Effect of the Invention

According to the present invention, the encrypted content key stored in the protective area of the copy source recording medium is first decrypted, and then encrypted with a key that depends on the copy destination recording medium when copying the copy source recording medium in which the encrypted content is written. The encrypted content is written as it is from the copy source recording medium into the copy destination recording medium without being decrypted. Since the copying process can be performed without performing decryption of the encrypted content, the process of copy is simplified, and the processing speed of the process becomes faster. Copy is efficiently performed particularly when the copy destination recording medium is in plural.

REFERENCE NUMERALS

Figure 1:
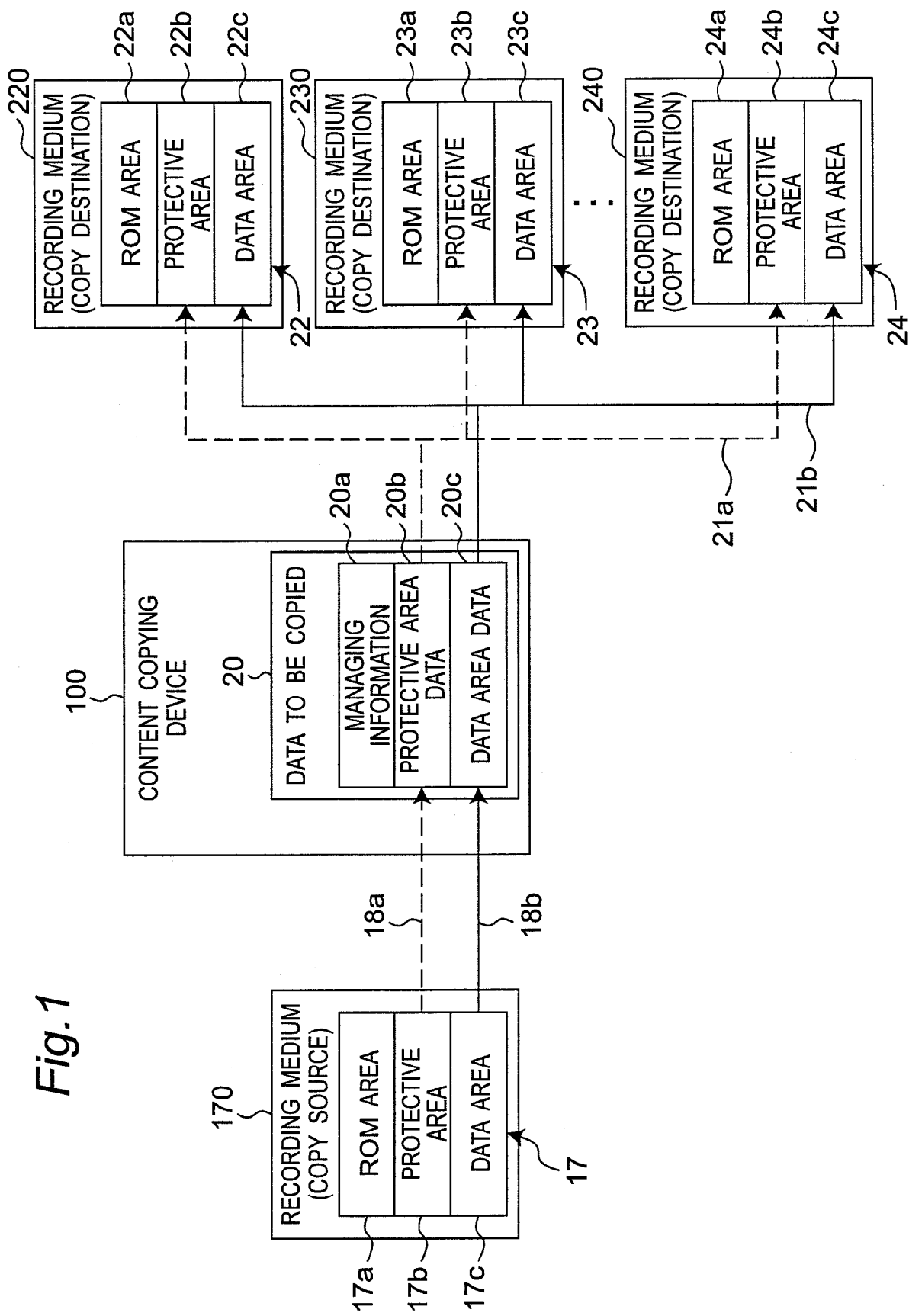
FIG. 1 is a diagram explaining an operation concept of a content copying device according to the present invention.

10 device key
11 mutual authentication section
12 medium unique key
14 content key encrypting section
20 recording medium storing data to be copied
25 content key decrypting section
43 encrypted content copying section
50, 51, 52 interface
100 content copying device
170 copy source recording medium
220, 230, 240 copy destination recording medium

BEST MODE FOR CARRYING OUT THE INVENTION

Embodiments of the present invention will now be described with reference to the accompanying drawings. The content copying device described below is realized by hardware, software, or a combination thereof.

First Embodiment 1.1 Outline of Content Copying Device

FIG. 1 is a diagram explaining an operation concept of a content copying device according to the present invention. The content copying device 100 is a device for copying data from a recording medium 170 on which content is written through a predetermined method, to n (n is greater than or equal to 1) recording media 220, 230, . . . , and 240.

The copy source recording medium 170 has a copyright protecting function, and includes a data storage section 17 that stores various data. The data storage section 17 includes a ROM area 17a capable of being read by host device, a protective area 17b capable of being read and written only when a mutual authentication with the host device is successful, and a data area 17c capable of being read and written irrespective of the mutual authentication. A content that is encrypted (encrypted content), for example, can be recorded in the data area 17c. A content key that is encrypted (encrypted content key), for example, can be recorded in the protective area 17b. The content key is a key used to decrypt the encrypted content.

The copy source recording medium 170 further includes an interface that exchanges data with the host device and a controller that controls the operation, but illustration of these elements is omitted. The content copying device 100 is one of the host devices.

The copy destination recording media 220, 230, . . . , and 240 have a function and a configuration similar to the copy source recording medium 170.

The content copying device 100 reads data in the protective area 17b of the copy source recording medium 170 (process 18a), and stores the same in a predetermined recording medium 20 as protective area data 20b of the data to be copied. Similarly, the data in the data area 17c of the copy source recording medium 170 is read (process 18b), and stored in a predetermined recording medium 20 as data area data 20c of the data to be copied. In reading data of the copy source recording medium 170, information required in data writing such as area range information of each data area and size information of the data are stored as managing information 20a of the data to be copied. The predetermined recording medium 20 for storing the data to be copied is a recording medium such as a semiconductor memory, a magnetic disc, an optical disc, and a hard disc. All the content data stored in the copy source recording medium does not need to be read from the copy source recording medium, and only content data selected by a user may be read and stored.

In FIG. 1, the data to be copied that is stored in the content copying device 100 is collectively described for the sake of simplifying the explanation, but does not need to be stored in the order of managing information 20a, protective area data 20b, and data area data 20c. Also, the managing information 20a may be separately stored from the protective area data and the data area data.

Subsequently, the content copying device 100 simultaneously writes in parallel the data to be copied stored in the predetermined recording medium 20 into a plurality of copy destination recording media 220, 230, . . . , and 240. The protective area data 20b of the data to be copied is written into the protective areas 22b, 23b, . . . , and 24b of the copy destination recording media 220, 230, . . . , and 240 (writing process 21a), and the data area data 20c is written into the data areas 22c, 23c, . . . , and 24c of the copy destination recording media 220, 230, . . . , and 240 (writing process 21b). The managing information 20a is referenced in the data writing process, and the data of the same area or the same size as the area of the copy source recording medium is written into the copy destination recording medium. In this case, all the content data stored in the predetermined recording medium 20 does not need to be written into the copy destination recording media, and only the data selected by the user may be written.

The reading processes 18a, 18b of the data in FIG. 1 can be executed in an arbitrary order. Similarly, the writing processes 21a and 21b can be executed in an arbitrary order.

Moreover, in the writing process, the writing process 21b may be similarly performed after simultaneously performing in parallel the writing process 21a on all the copy destination recording media 220, 230, . . . , 240. Alternatively, the writing process 21a and the writing process 21b may be performed in this order or in the reverse order on each copy destination recording medium regardless of the progress of the process on other copy destination recording medium that is being simultaneously parallel-processed.

1.2 Operation

The details of the copying process by the content copying device 100 according to the present embodiment will now be described. The copying process includes a process of reading the data to be copied from the copy source recording medium and a process of writing the data to be copied into the copy destination recording medium. Each process will be described below.

1.2.1 Process of Reading Data from Copy Source Recording Medium

The detailed operation of the content copying device 100 when reading the data to be copied from the copy source recording medium 170 will be described below.

Figure 2:
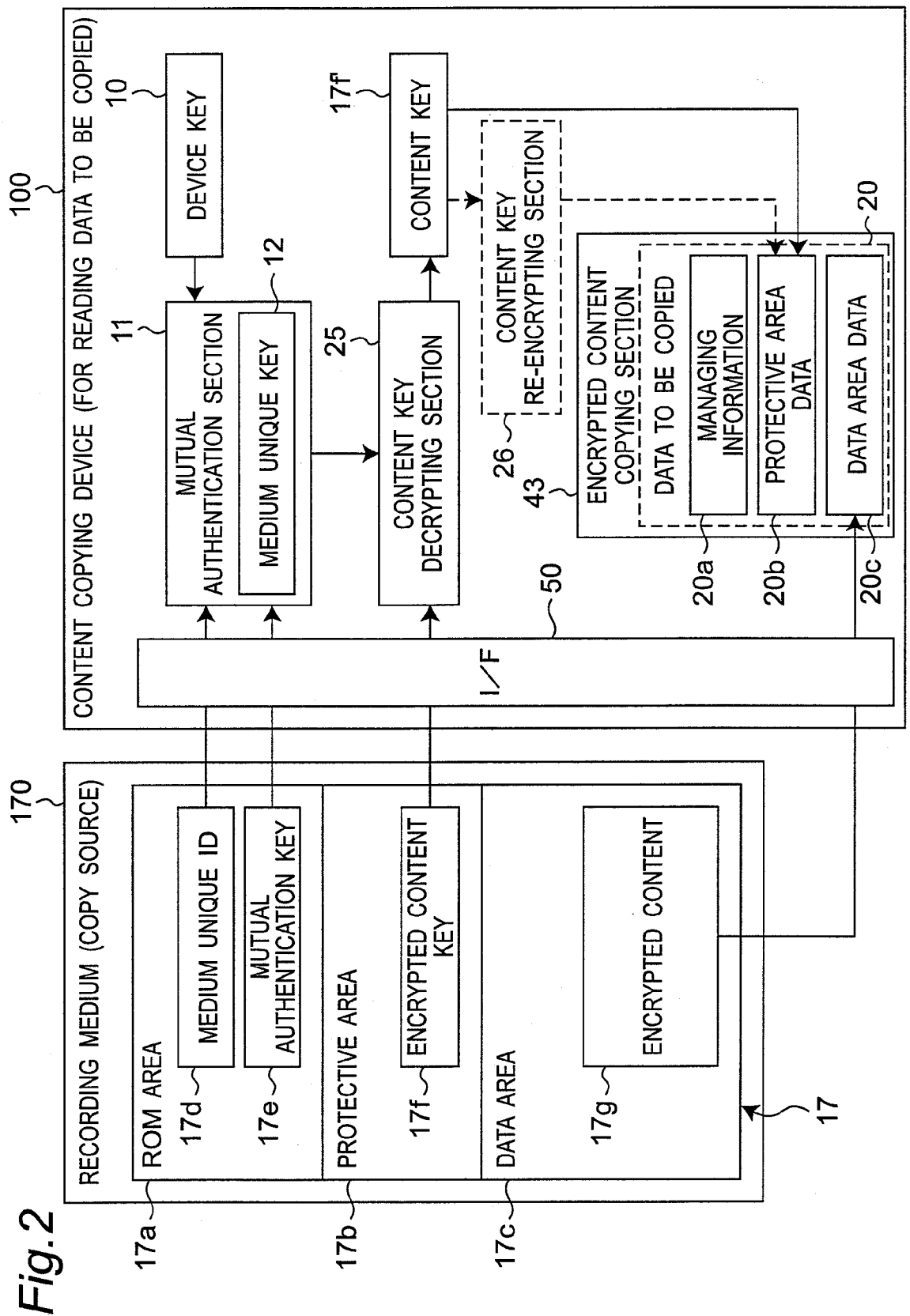
FIG. 2 is a diagram illustrating a configuration necessary for reading data to be copied from a copy source recording medium in the content copying device according to a first embodiment of the present invention.

FIG. 2 is a diagram illustrating the configuration necessary in the operation of reading the data to be copied from the copy source recording medium 170 in the content copying device 100.

The content copying device 100 includes a mutual authentication section 11 that performs a mutual authentication with the copy source recording medium 170, a content key decrypting section 25 that decrypts a content key, an encrypted content copying section 43 that transfers the encrypted content, and an interface 50 that exchanges data with the copy source recording medium 170. The interface 50 is a USB (Universal Serial Bus), for example. The content copying device 100 internally stores a device key 10, which is information unique to the content copying device 100.

The content copying device 100 having the above configuration reads the data to be copied in the following manner.

In the content copying device 100, the mutual authentication section 11 performs a mutual authentication before reading an encrypted content key 17f from the protective area 17b of the copy source recording medium 170. Specifically, the mutual authentication section 11 first reads a medium unique ID 17d and a mutual authentication key 17e from the ROM area 17a of the copy source recording medium 170, and performs the mutual authentication with the recording medium 170 using these read information and the device key 10 stored in the content copying device 100. A first medium unique key 12b is consequently generated.

Subsequently, the content key decrypting section 25 reads the encrypted content key 17f from the protective area 17b of the copy source recording medium 170, decrypts the encrypted content key 17f using the medium unique key 12, and generates a content key 17f'. The content key decrypting section 25 stores the content key 17f in a predetermined recording medium 20 as the protective area data 20b of the data to be copied. The content copying device 100 may include a content key re-encrypting section 26 for encrypting the content key 17f' with a different key, as shown with the broken line in FIG. 2. In this case, the encrypted content key 17f' is stored in the predetermined recording medium 20 as the protective area data 20b.

The encrypted content copying section 43 reads an encrypted content 17g from the data area 17c of the copy source recording medium 170, and stores the same as it is without decrypting it in the predetermined recording medium as data area data 20c of the data to be copied.

The process of reading data from the copy source recording medium 170 is thereby completed.

1.2.2 Process of Writing Data Into Copy Destination Recording Medium

The detailed operation of the content copying device 100 when writing the data to be copied into the copy destination recording medium will now be described.

Figure 3:
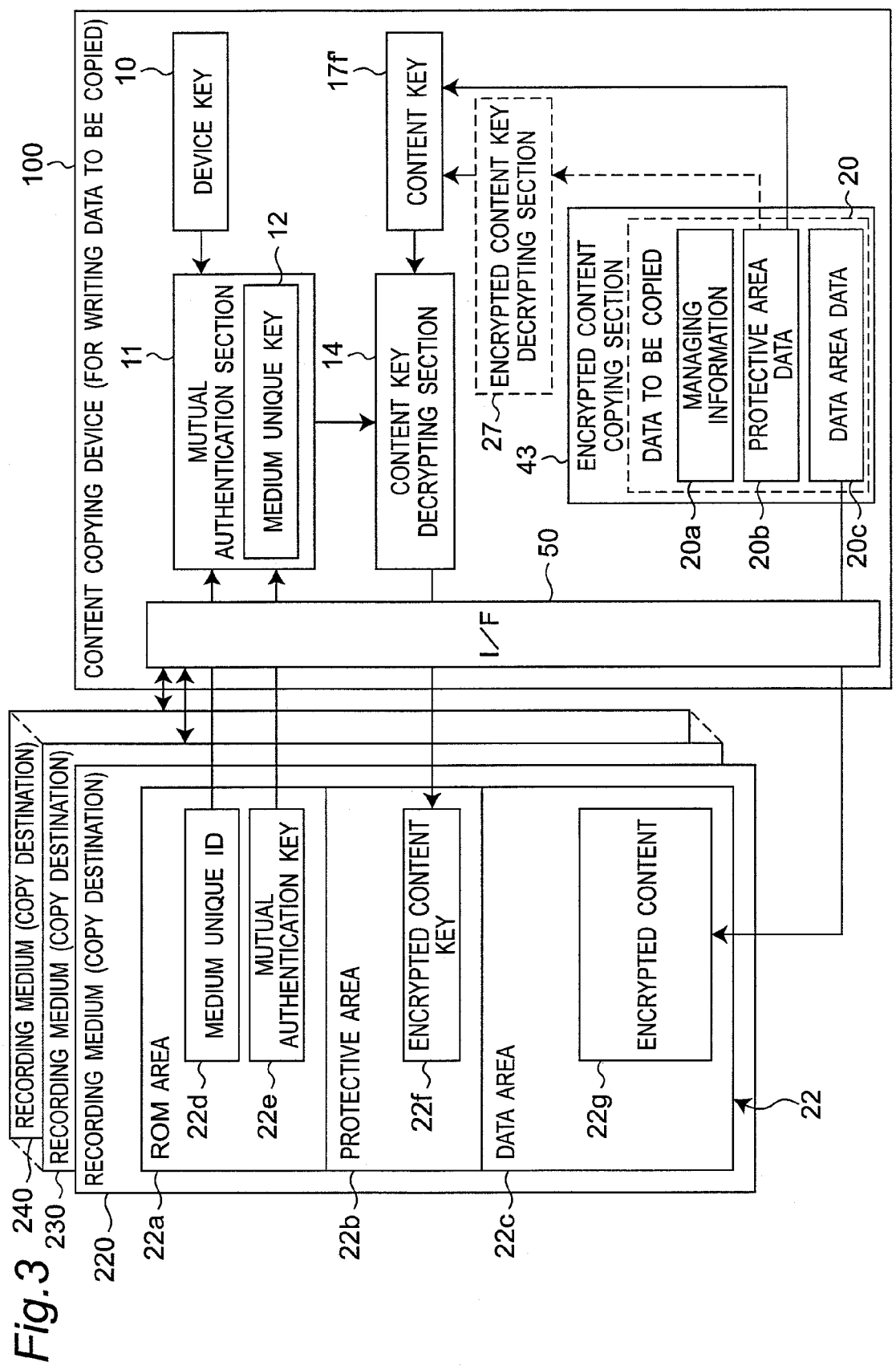
FIG. 3 is a diagram illustrating a configuration necessary for writing data to be copied to the copy destination recording medium in the content copying device according to the first embodiment of the present invention.

FIG. 3 is a diagram illustrating the configuration necessary in writing the data to be copied into the copy destination recording media 220, 230, . . . , and 240 in the content copying device 100. The constituent elements not used in writing the data to be copied into the copy destination recording media 220, 230, . . . , and 240 are omitted in FIG. 3.

As shown in FIG. 3, the content copying device 100 further includes a content key encrypting section 14 that encrypts the content key in addition to the configuration shown in FIG. 2.

The interface 50 performs exchange of data with the copy destination recording media 220, 230, . . . , and 240, and the mutual authentication section 11 performs the mutual authentication with the copy destination recording media 220, 230, . . . , and 240.

The content copying device 100 having the above configuration writes the data to be copied in the following manner. The writing process performed on one copy destination recording medium 220 will be described for the sake of convenience of the explanation, but similar processes are simultaneously performed in parallel on other recording media.

First, the mutual authentication is performed by the mutual authentication section 11 between the copy destination recording medium 220 and the content copying device 100, and the medium unique key 12 is generated. The process of writing the protective area data 20b is then performed. That is, the content key 17f is read from the predetermined recording medium 20. The content key 17f is encrypted by the content key encrypting section 14 with the medium unique key 12 relating to the copy destination recording medium 220, and saved in the protective area 22b of the copy destination recording medium 220 as an encrypted content key 22f.

When the content copying device 100 includes the content key re-encrypting section 26 as shown with the broken line in the configuration of FIG. 2, the content copying device 100 must also include an encrypted content key decrypting section 27 shown with the broken line in FIG. 3. In this case, the protective area data 20b encrypted by the content key re-encrypting section 26 and stored in the predetermined recording medium 20 is decrypted into the content key 17f by the encrypted content key decrypting section 27. Thereafter, the decrypted content key 17f is encrypted by the content key encrypting section 14, and written into the copy destination recording medium 220.

The encrypted content copying section 43 writes the data saved as the data area data 20c of the data to be copied as it is into the data area 22c of the copy destination recording medium 220 as an encrypted content 22g.

The process of writing data into the copy destination recording medium 220, that is, the copying process of the encrypted content from the copy source recording medium 170 to the copy destination recording medium 220 is thereby completed.

Accordingly, when copying the encrypted content from the copy source recording medium to the copy destination recording medium, the content copying device 100 according to the present embodiment writes into the copy destination recording medium only the content key after the decryption and the encryption, and writes the encrypted content as it is into the copy destination recording medium. The decrypting process of the encrypted content and the encrypting process are thus not necessary, and high-speed and easy copying process is realized.

1.2.3 Verifying Process for Write Data

The verifying process after writing of data to the copy destination recording medium will now be described.

Figure 4:
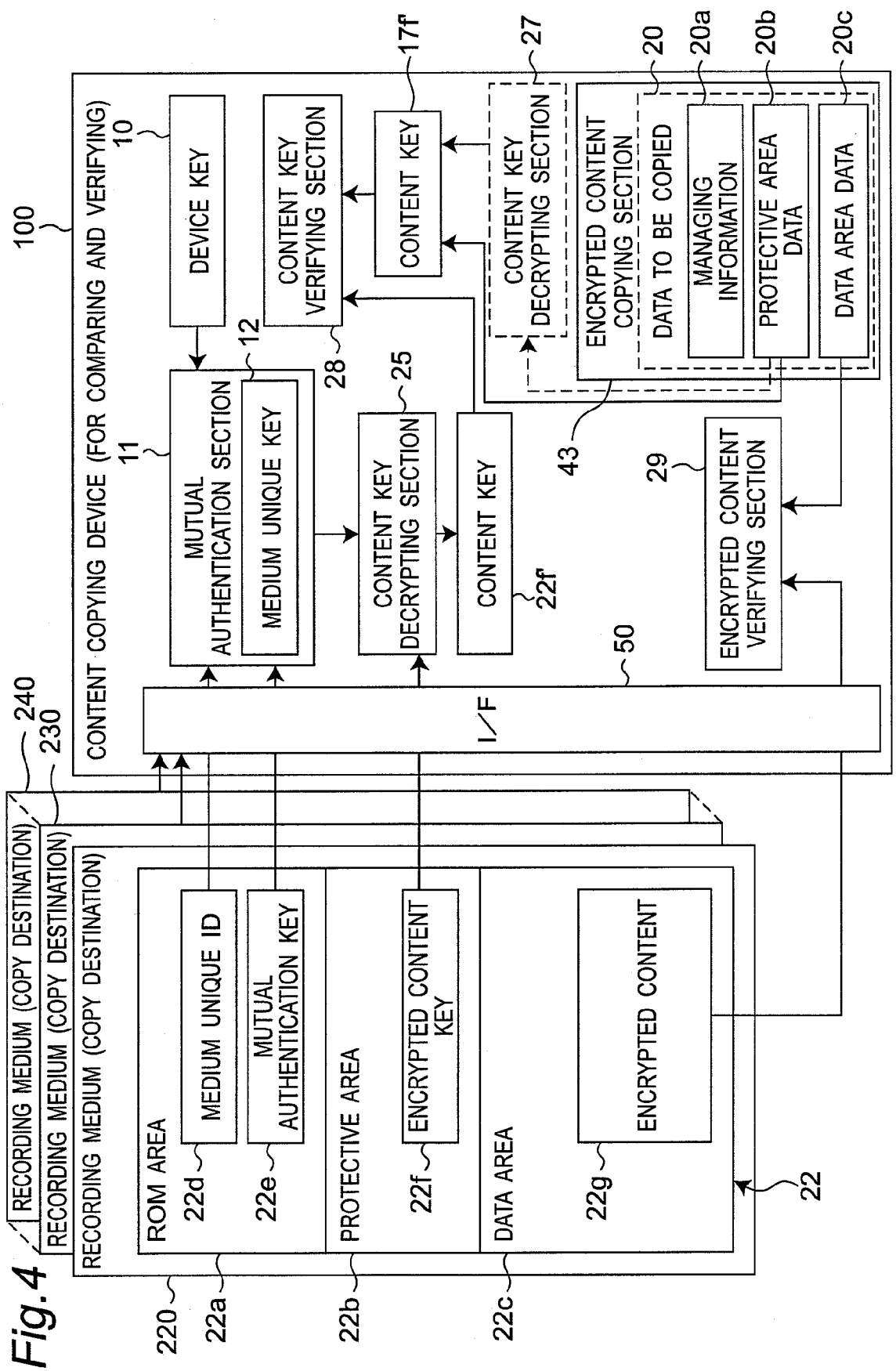
FIG. 4 is a diagram illustrating a configuration necessary in a verifying process conducted for the data writing to the copy destination recording medium in the content copying device according to the first embodiment of the present invention.

FIG. 4 is a diagram illustrating the configuration necessary in the verifying process of verifying whether the data of each area written into the copy destination recording medium 220, 230, . . . , and 240 has been properly written, in the content copying device 100.

In addition to the configuration shown in FIGS. 2 and 3, the content copying device 100 includes a content key verifying section 28 that compares and verifies the content key recorded on the copy destination recording medium with the content key stored in the content copying device 100, and an encrypted content verifying section 29 that compares and verifies the encrypted content recorded on the copy destination recording medium and the encrypted content stored in the content copying device 100.

The content copying device 100 having the above configuration performs the verifying operation in the following manner after the writing of the encrypted content and the encrypted content key into the copy destination recording medium is completed. The process performed for only the copy destination recording medium 220 will be described for the sake of convenience of the explanation, but similar processes are simultaneously performed in parallel for other copy destination recording media.

The mutual authentication process is performed by the mutual authentication section 11 between the copy destination recording medium 220 and the content copying device 100. The content key decrypting section 25 then reads and decrypts the encrypted content key 22f from the copy destination recording medium 220, and generates a content key 22f'. The content key 17f' of the copy source recording medium is generated through a method similar to that in the writing described above from the protective area data 20b of the data to be copied.

After the two content keys 22f', 17f' are prepared, the content key verifying section 28 compares the two content keys, and checks whether or not the encrypted content key has been properly written into the copy destination recording medium 220. The encrypted content verifying section 29 reads the encrypted content 22g from the copy destination recording medium 220, compares the same with the data area data 20c, and checks whether or not the encrypted content has been properly written into the copy destination recording medium 220. The content key verifying section 28 and the encrypted content verifying section 29 output results of the verification to, e.g., a display device to notify the user.

1.2.4 Simultaneous Parallel Processing

A method of performing the copying process simultaneously in parallel on the plurality of recording media will be described below. The content copying device 100 described with reference to FIGS. 1 to 4 is realized by using a computer including a CPU, and each function described above can be realized when the CPU executes a main program. One copy source recording medium (drive) and a plurality of copy destination recording media (drives) are connected to the content copying device 100 by way of the interface 50. The user specifies in advance copy from which recording medium to which recording medium.

An example of realizing simultaneous parallel processing using threads (executable unit of software on operating system) will be described below. A plurality of processes can be executed simultaneously in parallel by simultaneously running the plurality of threads.

When starting the copying process, the content copying device 100 creates a thread of performing the process on the copy destination recording medium for every copy destination recording medium. When ten copy destination recording media are connected to the interface 50, ten threads are created. The main program is responsible for the creation of the thread. Each thread is in a standby status for a process command from the main program after, e.g., a predetermined initialization process is performed.

Subsequently, the main program sequentially issues a "write start" message to each thread. When receiving the message, each thread starts the writing process on each copy destination recording medium. The writing process is performed in parallel on all the copy destination recording media.

The contents of the processing with respect to each copy destination recording medium are completely the same, and the specific contents thereof are as described above. That is, the processing contents of one thread include the following contents.

data reading process from a copy source recording medium, and data writing process on a copy destination recording medium The above processes are sequentially performed for the data of the protective area and the data area.

The copy onto the plurality of recording media thus can be performed simultaneously in parallel.

When the process of reading data from the copy source recording medium is once executed, the information of the encrypted content and the decrypted content key serving as the data to be copied are stored inside the content copying device 100 as the data to be copied, and this information has become information that no longer depends on the copy source recording medium. Thus, it may be configured that the process of reading data from the copy source recording medium is performed only once, and thereafter, the process of writing data is performed for every copy destination recording medium using the stored data to be copied. Speeding up of the processes in copying to a plurality of recording medium is thereby achieved.

1.3 Variant

In the present embodiment, each data may be compared for every one byte, and other methods such as using a checksum, a cyclic code, a message digest etc. may be used for the method used in verification.

Similar to the reading, when the managing information is required in writing or in verification, necessary information is appropriately read from the managing information 20a of the data to be copied and used in each process.

The data to be copied may be stored even after the writing process on the copy destination recording medium, that is, the copying process is completed. The information stored in this manner does not depend on the copy source recording medium. Thus, the data to be copied can be reused, and the encrypted content does not need to be read from the copy source recording medium every time.

The data may be read or written in any manner in reading and writing the data from and into each area in the recording medium in FIGS. 2 to 4. For instance, the data in the data area may be read and written by logical files or directories, or may be read and written in physical recording unit (block, sector, cluster, etc.) of the recording medium.

Means for storing the data to be copied in the content copying device 100 is realized with a recording medium such as a volatile memory, a nonvolatile memory, and a hard disc. The storing area and the storing format of the data to be copied are not limited to those described in the present embodiment.

Similarly, only one type of data exists in the data area and the protective area of the recording medium in the example shown in FIGS. 1 to 4, but the encrypted content and the encrypted content key may exist in plural. In this case as well, the method of storing, writing, and verifying each encrypted content and encrypted content key can be performed through the above method.

In the present embodiment and the following embodiment, various data such as audio information, images, video picture information, data usable in personal computers, and composite data configured from these, etc. are contained in the content.

Furthermore, even when the way of saving, in the data area and the protective area of the recording medium, the encrypted content and the encrypted content key for decrypting the same differs for each type of the information, the basic method is as described above, and which data of which area to read or write can be selectively performed.

In the present embodiment and the following embodiment, the copy source or copy destination recording medium includes various recording media capable of storing the data. The semiconductor memory, optical disc, magnetic disc, and the like may be used.

Second Embodiment 2.1 Configuration

Figure 5:
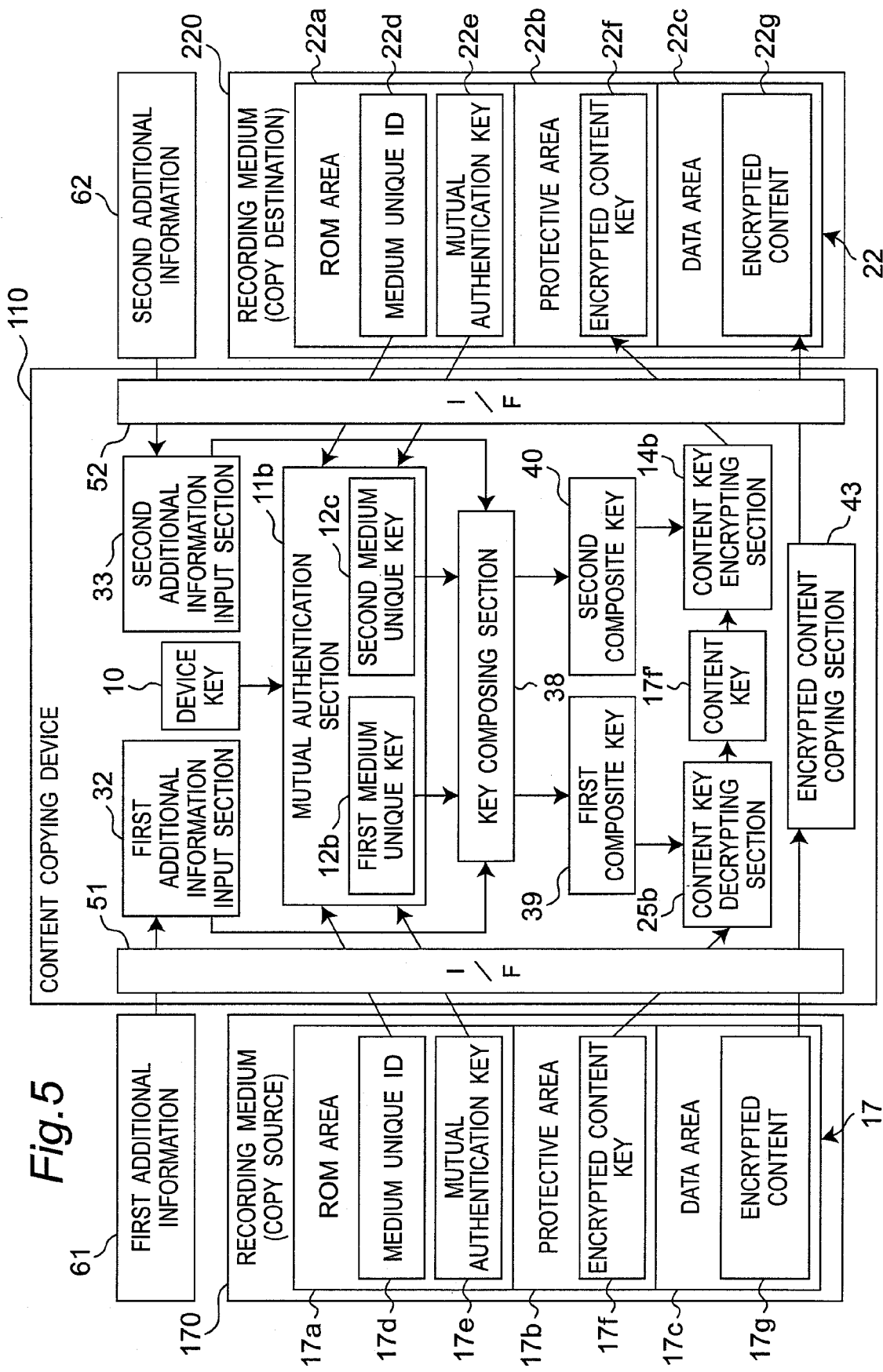
FIG. 5 is a diagram illustrating a configuration of a content copying device according to a second embodiment of the present invention.

FIG. 5 is a block diagram illustrating a configuration of a content copying device according to the present embodiment.

The content copying device 110 has a function of copying an encrypted content from a copy source recording medium 170 to a copy destination recording medium 220. The content copying device 110 includes a first additional information input section 32 that inputs first additional information 61 with respect to the copy source recording medium 170, a second additional information input section 33 that inputs second additional information 62 with respect to the copy destination recording medium 220, a mutual authentication section 11b that performs a mutual authentication between the recording media 170 and 220, a key composing section 38 that generates a composite key, a content key decrypting section 25b that decrypts the content key, a content key encrypting section 14b that re-encrypts the content key, an encrypted content copying section 43 that transfers the encrypted content, and interfaces 51 and 52 that exchanges data with the recording media 170 and 220. The additional information includes a key unique to a terminal such as a telephone number etc. of a mobile telephone.

2.2 Operation

The operation of copying the encrypted content from the recording medium 170 to the recording medium 220 by the content copying device 110 configured as above will now be described.

In the content copying device 110, the mutual authentication section 11b first reads a medium unique ID 17d and a mutual authentication key 17e from a ROM area 17a of the copy source recording medium 170, and performs a mutual authentication with the recording medium 170 using these pieces of information and a device key 10 stored in the content copying device 110. A first medium unique key 12b is consequently generated.

The key composing section 38 generates a first composite key 39 using the first medium unique key 12b and the first additional information 61 inputted to the first additional information input section 32.

Similarly, the content copying device 110 generates a second composite key 40 from the information stored in a ROM area 22a of the recording medium 220 and the second additional information 62. That is, the mutual authentication section 11b reads a medium unique ID 22d and a mutual authentication key 22e from the ROM area 22a of the copy destination recording medium 220, generates a second medium unique key 12c using the device key 10. A second composite key 40 is generated by the key composing section 38 from the second additional information 62 inputted from the second additional information input section 33 and the second medium unique key 12c.

The content key decrypting section 25b then reads an encrypted content key 17f from a protective area 17b of the transfer source recording medium 170, decrypts the same with the first composite key 39, and generates a content key 17f′. The generated content key 17f′ is stored inside the content copying device 110. The content key encrypting section 14b encrypts the stored content key 17f′ with the second composite key 40 and generates an encrypted content key 22f, and stores the same in the protective area 22b of the transfer destination recording medium 220.

The encrypted content copying section 43 records the encrypted content 17g recorded in the data area 17c of the transfer source recording medium 170 into the data area 22c of the transfer destination recordi encrypted content 22g. At this time, the encrypted content ng medium 220 as the is copied as it is without being decrypted and re-encrypted.

Therefore, in the present embodiment, the encrypted content is recorded on the copy destination recording medium while the portion in which the encrypted content of the copy source depends on the first medium unique information and the first additional information is converted so as to depend on the second medium unique information and the second additional information associated with the copy destination recording medium.

The encrypted content key 22f and the encrypted content 22g copied onto the transfer destination recording medium 220 in the above described manner depend only on the second additional information 62 and the second medium unique key 40, and do not depend on the first additional information 61 and the medium unique information of the transfer source recording medium 170. Therefore, this encrypted content can be reproduced with the equipment capable of reproducing the encrypted content in the transfer destination recording medium 220.

In other words, according to the present embodiment, the encrypted content key in the protective area of the copy source recording medium is first decrypted and then stored when copying the recording medium in which the encrypted content is written. The content key stored in this manner does not depend on additional information and the types of recording medium, and thus an arbitrary number of copies can be made using the stored content key as long as the medium unique key of the copy destination recording medium and the second composite key are known. Furthermore, the copy can be very efficiently performed, since the encrypted content in the data area can be copied without being decrypted and re-encrypted.

2.3 Variant

The order of inputting and processing of the first additional information 61 and the second additional information 62 in FIG. 5 does not particularly matter, and the input timing of these information may be either before or after the process performed by the mutual authentication section 11b as long as it is before composing the composite keys 39 and 40 corresponding to each information by the key composing section 38.

In the example of FIG. 5, the decryption and the encryption of the content key, and the copy of the encrypted content are performed as a series of processes, but reading and writing may be separated as separate processing stages. That is, the content key 17f′ and the encrypted content 17g may be temporarily stored as it is or after being subjected to some kind of processes, and then the stored information may be recorded on the copy destination recording medium 220. In this case, the second additional information 62 may be inputted simultaneously with the reading of the information from the copy source recording medium 170 and stored along with the content key and the like, or may be inputted when actually performing writing on the copy destination recording medium 220.

Furthermore, the first additional information 61 and the second additional information 62 may be the same. In this case, the composite keys 39, 40 are generated from either the first additional information 61 or the second additional information 62. The first additional information 61 and the second additional information 62 may be group unique information assigned on a group basis. In the case of group unique information, the encrypted content 22g finally recorded on the recording medium 220 is reproducible by the terminal that knows the group unique information.

Furthermore, when the first additional information 61 and the second additional information 62 are special values or not inputted, the key composing section 38 may generate a composite key that becomes equal to the respective medium unique key. In this case, the encrypted content key 22f finally recorded in the protective area 22b of the copy destination recording medium 220 becomes the same as that encrypted with the second medium unique key 12c.

In FIG. 5, the explanation has been made on the basis that the second additional information 62 and the copy destination recording medium 220 are singular. However, the content can be copied simultaneously in parallel to a plurality of copy destination recording media by applying the concept of the present embodiment as in the first embodiment. In this case, single group unique information may be given as the second additional information 62, and the same encrypted content key and the encrypted content may be written onto the plurality of copy destination recording media for the reproduction device included in the group. Alternatively, the additional information corresponding to each copy destination recording medium may be given for the number of copy destination recording medium, where the reproduction device reproduces the encrypted content in the recording medium corresponding to itself. In either case, the basic operation of the encrypted content copying device 110 is the same, and the concept of the present invention can be applied.

Furthermore, an example of copying a set of encrypted content key and encrypted content from the copy source recording medium 170 to the copy destination recording medium 220 has been described for the sake of convenience of the explanation in the present embodiment. However, a plurality of sets of encrypted content key and encrypted content may be copied. In this case, the content key encrypting section 14b may record the encrypted content key into the copy destination recording medium 220 every time the content key decrypting section 25b generates each content key. Alternatively, the content key encrypting section 14b may store encrypted content keys and encrypted contents for a certain number of times or in a certain unit, and collectively record them into the copy destination recording medium 220.

The mid-processes are optional as long as the set of encrypted content key and encrypted content finally recorded on the transfer destination recording medium 220 are all copied in a reproducible form.

Furthermore, any data structure or any storing method may be employed for the encrypted content and the encrypted content key. When the encrypted content key is stored as one part of a predetermined data structure and the data portion other than the encrypted content key is not encrypted, the data containing the encrypted content key is appropriately processed in the content key decrypting section 25b and the content key encrypting section 14b, and finally recorded on the copy destination recording medium 220. When a different data structure other than the data structure such as files for managing the encrypted content key exists in the protective area 17b of the recording medium 170, the relevant data is also copied to the protective area 22b of the copy destination recording medium 220 if such data is necessary in reproducing the encrypted content.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2005-012290 (filed on Jan. 20, 2005) and No. 2005-045030 (filed on Feb. 22, 2005), which is expressly incorporated herein by reference in its entirety.

INDUSTRIAL APPLICABILITY

The present invention is applicable to copy an encrypted content from one recording medium to another recording medium, and is particularly useful for preparation the recording medium in which the encrypted content is written in advance for the purpose of mass-distribution and mass-selling by content providers.

The invention claimed is:

1. A content copying device that copies an encrypted content from a first recording medium to a plurality of second recording media,
    the first recording medium having a first authentication key, an encrypted content key which is a content key subject to encryption, and an encrypted content which is a content encrypted with the content key which is not encrypted,
    each of the plurality of second recording media having a second authentication key,
    the content copying device comprising:
        a first generator operable to perform a mutual authentication with the first recording medium to generate a first medium unique key corresponding to the first authentication key;
        an obtainer operable to obtain the encrypted content key and the encrypted content from the first recording medium; and
        a first re-encryptor operable to decrypt the encrypted content key which is obtained from the first recording medium with the first medium unique key, and re-encrypt the decrypted content key with a key which is different from the first medium unique key,
    wherein the content copying device is configured to copy the content to the plurality of second recording media based on the encrypted content obtained from the first recording medium and the re-encrypted content key.

2. The content copying device according to claim 1, further comprising:
    a second generator operable to perform a mutual authentication with each of the plurality of second recording media to generate second medium unique keys which each correspond to the second authentication key of one of the plurality of second recording media;
    a second re-encryptor operable to decrypt the re-encrypted content key with the key different from the first medium unique key, and re-encrypt the decrypted content key with each of the second medium unique keys; and
    an outputter operable to output the encrypted content and the re-encrypted content key to each of the plurality of second recording media based on the second medium unique keys which are used for re-encrypting the decrypted content key.

3. The content copying device according to claim 2, wherein the outputter outputs the encrypted content and the re-encrypted content key to the plurality of second recording media simultaneously in parallel.

4. The content copying device according to claim 1, further comprising a first confirmer operable to confirm whether the encrypted content obtained from the first recording medium can be decrypted correctly in the content copying device.

5. The content copying device according to claim 2, further comprising a second confirmer operable to confirm whether the encrypted content output to one of the plurality of second recording media can be decrypted correctly in the one of the plurality of second recording media.

6. The content copying device according to claim 1, further comprising a content copier operable to copy the encrypted content to the plurality of second recording media without decrypting the encrypted content.

7. A content copying device that copies an encrypted content from a first recording medium to a plurality of second recording media,
    the first recording medium having a first authentication key, an encrypted content key which is a content key encrypted with a recording medium composite key, and an encrypted content which is a content encrypted with the content key which is not encrypted,
    each of the plurality of second recording media having a second authentication key,
    the content copying device comprising:
        a first generator operable to perform a mutual authentication with the first recording medium to generate a first medium unique key corresponding to the first authentication key;
        a first receiver operable to receive first input information;
        a first composite key generator operable to generate a first composite key based on the generated first medium unique key and the first input information;
        an obtainer operable to obtain the encrypted content key and the encrypted content from the first recording medium; and
        a first re-encryptor operable to decrypt the encrypted content key which is obtained from the first recording medium with the first composite key, and re-encrypt the decrypted content key with a key which is different from the first medium unique key and the first composite key,
    wherein the content copying device is operable to copy the content to the plurality of second recording media based on the encrypted content obtained from the first recording medium and the re-encrypted content key.

8. The content copying device according to claim 7, further comprising:
- a second generator operable to perform a mutual authentication with each of the plurality of second recording media to generate second medium unique keys which each correspond to the second authentication key of one of the plurality of second recording media;
- a second receiver operable to receive second input information;
- a second composite key generator operable to generate second composite keys based on each of the generated second medium unique keys and the second input information;
- a second re-encryptor operable to decrypt the re-encrypted content key with a key independent of the first medium unique key, and re-encrypt the decrypted content key with each of the second composite keys; and
- an outputter operable to output the encrypted content, the re-encrypted content key, and the second input information to each of the plurality of second recording media based on the second medium unique keys from which the second composite keys used for re-encrypting are generated.

9. The content copying device according to claim 7, further comprising a content copier operable to copy the encrypted content to the plurality of second recording media without decrypting the encrypted content.

10. A content copying method for copying an encrypted content from a first recording medium to a plurality of second recording media,
- the first recording medium having a first authentication key, an encrypted content key which is a content key subject to encryption, and an encrypted content which is a content encrypted with the content key which is not encrypted,
- each of the plurality of second recording media having a second authentication key, the content copying method comprising:
- performing a mutual authentication with the first recording medium to generate a first medium unique key corresponding to the first authentication key;
- obtaining the encrypted content key and the encrypted content from the first recording medium; and
- decrypting the encrypted content key which is obtained from the first recording medium with the first medium unique key; and
- re-encrypting the decrypted content key with a key which is different from the first medium unique key,
- wherein the content can be copied to the plurality of second recording media based on the encrypted content obtained from the first recording medium and the re-encrypted content key.

11. The content copying method according to claim 10, further comprising:
- performing a mutual authentication with each of the plurality of second recording medium to generate second medium unique keys which each correspond to the second authentication key of one of the plurality of second recording media;
- decrypting the re-encrypted content key with a key independent of the first medium unique key, and re-encrypting the decrypted content key with each of the second medium unique keys; and
- outputting the encrypted content and the re-encrypted content key to each of the plurality of second recording medium based on the second medium unique keys which are used for re-encrypting the decrypted content key.

12. The content copying method according to claim 10, wherein the encrypted content and the re-encrypted content key is output to the plurality of second recording media simultaneously in parallel.

13. The content copying method according to claim 10, further comprising:
- copying the encrypted content to the plurality of second recording media without decrypting the encrypted content.

* * * * *